3,453,300
PREPARATION OF ZINC ETHYL
ACETOACETATE CHELATE
Andrew C. Backus, Baltimore, Md., and Louis L. Wood, Washington, D.C., assignors to W. R. Grace & Co., a corporation of Connecticut
No Drawing. Continuation-in-part of application Ser. No. 598,603, Dec. 2, 1966. This application Dec. 14, 1967, Ser. No. 690,424
Int. Cl. C07f 3/06
U.S. Cl. 260—429.9                    4 Claims

ABSTRACT OF THE DISCLOSURE

A method for preparing zinc ethyl acetoacetate chelate which comprises reacting zinc methoxides with ethyl acetoacetate in the presence of a lower alkanol, and recovering the zinc chelate is disclosed.

---

This is a continuation-in-part of our copending application Ser. No. 598,603, filed Dec. 2, 1966, now abandoned.

The prior art discloses numerous zinc compounds which have been used as stabilizer additives for polyvinyl halide resins and polyvinylchloride in particular. Many of the prior art compounds present various problems in their use in that they are difficult to compound and/or cause undesirable coloration or pigmentation of the finished resin product.

In summary, this invention is directed to the compound zinc ethyl acetoacetate chelate.

It is therefore an object of the present invention to provide a novel zinc containing organic complex which is useful as a thermal stabilizer additive for polyvinyl halide resins.

It is another object to provide a convenient method for preparing zinc ethyl acetoacetate chelate.

These and still further objects of the present invention will become readily apparent to one skilled in the art from the following detailed description and specific examples.

Broadly, the present invention contemplates zinc ethyl acetoacetate chelate as a novel composition and also a convenient method for its preparation.

More specifically, we have found that zinc ethyl acetoacetate chelate which possesses the formula

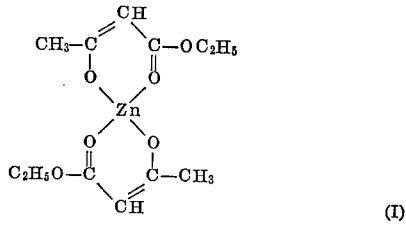

is a particularly effective thermal stabilizer for polyvinyl halide resins. The compound provides a high degree of stabilization when incorporated along with other additives in amounts ranging from about 0.05 to about 5.0 parts per hundred parts by weight of resin. Preferably the present chelate is used in combination with other conventional additives such as epoxies and orthoesters.

The novel zinc ethyl acetoacetate of the present invention is preferably prepared by reacting zinc methoxide with ethyl acetoacetate in the presence of a solvent such as methanol. The reaction which occurs may be generally outlined as follows:

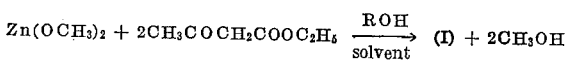

wherein R represents lower alkyl having 1 to 3 carbon atoms.

The above reaction occurs in a satisfactory manner when substantially stoichiometric amounts of reactants are used. However, in view of the fact the acetoacetate ingredient is the less expensive, it is generally preferred that a slight excess be used.

As indicated above, the reaction is carried out in the presence of a lower alkanol, preferably methanol, which may be conveniently recovered at the end of the reaction. Preferably from about 0.5 to about 10 parts by weight of lower alkanol are present per part by weight of the ethyl acetoacetate present during the reaction.

The above reaction proceeds at a satisfactory rate at room temperature. However, it is contemplated that temperatures ranging from about 0 to about 100° C. may be adapted if desired. At these temperatures it is found that the required reaction substantially reaches completion in from about 0.25 to about 2.0 hours. The zinc methoxide ingredient used in the present reaction is obtained by any means known to those skilled in the art. Convenient method involves reacting zinc chloride with a solution of sodium methoxide in excess methanol. It is found that during the reaction the desired zinc methoxide remains in solution and sodium chloride, which precipitates, may be readily removed by a simple filtration step.

As indicated above, the present composition of matter comprise utility as a thermal stabilizer ingredient for polyvinylhalide resins. The present additive may be incorporated alone or in combination with other conventional stabilizers or improvement additives commonly incorporated in polyvinylhalide resin compositions. Typical prior art additives which may be present are epoxy derivatives such as epoxidized soybean oil, orthoesters such as glyceryl orthoacetate, high molecular weight polyols such as pentaerythritol, and so forth. The present zinc chelate additive is incorporated in resins using conventional blending techniques and in amounts generally ranging from about 0.1 to about 1.0 parts by weight resin.

Having disclosed the basic aspects of the present invention, the following example is given to illustrate a specific embodiment thereof.

Example I 18 grams of metallic sodium were dissolved in 500 ml. of methanol. To this solution 50.3 grams of zinc chloride was added. The mixture was maintained at a temperature of 25° C. whereupon a white precipitate of sodium chloride appeared within 1 minute. The reaction mixture was maintained for a period of 0.25 hour and subsequently filtered through a celite filter whereupon a clear colored solution of zinc methoxide was obtained.

Next, 100 ml. of ethyl acetoacetate was dissolved in 300 ml. of methanol. The above solution of zinc methoxide was added thereto, whereupon a voluminous white precipitate formed at room temperature. The material was collected on a filter and washed once with methanol at room temperature. The solid was dried at 40° C. under 30 mm. of Hg pressure for 4 hours. Upon subsequent crystallizations a total of 107 grams (84% yield) of the desired zinc ethylacetoacetate chelate was obtained. The product was a white crystalline solid melting with decomposition at 145–150° C..

Example II

To illustrate the utility of the above zinc chelate, the following compositions were compounded with polyvinyl chloride and tested in a conventional manner as indicated below.

Polyvinyl chloride (PVC) having a number average molecular weight of about 38,000 was dry blended with the components listed in "Components" column of the runs summarized in the table presented infra. The resulting dry blends were individually placed in the mixing chamber of a Brabender Plastograph at 190° C. which was open to the air. A roller speed of 60 r.p.m. was used to knead the polymer formulations. The Brabender Plastograph continuously recorded the torque required to knead the mass. From the resultant torque measurement, time required for the particulate mixture to fuse into a workable plastic mass, i.e. flux time, was determined. Furthermore, the time required to achieve the onset of crosslinking, i.e., decomposition time was determined. The actual temperature of the plastic mass was also continuously measured. From time to time small samples of the polymer were removed from the mixing chamber and their color compared to those of the standard Gardner scale. The results of these runs are tabulated in the table below.

3. The method of claim 1 wherein the alkanol is methanol.

4. A method for preparing zinc ethyl acetoacetate chelate, comprising:
  (a) reacting at about 0–100° C. a reaction mixture consisting essentially of zinc methoxide and ethyl acetoacetate in the presence of a lower alkanol having 1–3 carbon atoms, the weight ratio of ethyl acetoacetate to lower alkanol being about 1:0.5–10, the zinc methoxide and ethyl acetoacetate being present in substantially stoichiometric quantities, the reaction time being about 0.25–2 hours;
  (b) separating the thus formed zinc ethyl acetoacetate from the reaction mixture;
  (c) drying the separated zinc ethyl acetoacetate and recovering dried zinc ethyl acetoacetate product, said product melting with decomposition at 145–150° C.

| Run | Components | Parts per 100 parts PVC resin | Flux time (min.) | Torque (kg.) | Polymer Temp., °C. | Decomp. time (min.) after flux | Color, Gardner scale | | |
|---|---|---|---|---|---|---|---|---|---|
| | | | | | | | 2 min. | 4 min. | 10 min. |
| 1 | Zn ethylacetoacetate | 0.2 | 0 | 1.5–2.4 | 191–217 | 13.5 | 1.0 | 1.5 | 1.5 |
| | Poly(glycerylorthoacetate) | 5.0 | | | | | | | |
| | Cetyl alcohol | 2.0 | | | | | | | |
| | Stearic acid | 0.5 | | | | | | | |
| 2 | Zn ethylacetoacetate | 0.8 | 0 | 1.5–2.4 | 193–214 | 13.5 | 0.5 | 1.0 | 1.0 |
| | Poly(glycerylorthoacetate) | 5.0 | | | | | | | |
| | Cetyl alcohol | 2.0 | | | | | | | |
| | Stearic acid | 0.5 | | | | | | | |
| 3 | Poly(glycerylorthoacetate) | 5.0 | 0 | 1.4–2.4 | 190–210 | 15.5 | 2.0 | 2.0 | 2.0 |
| | Cetyl alcohol | 2.0 | | | | | | | |
| | Stearic acid | 0.5 | | | | | | | |
| 4 | Zn ethylacetoacetate | 0.2 | 0 | 1.5–2.4 | 194–214 | 11.5 | 2.5 | 6.5 | 15 |
| | Epoxidized soybean oil | 5.0 | | | | | | | |
| | Acryloid K120N (processing aid) | 5.0 | | | | | | | |
| | Ca stearate | 0.4 | | | | | | | |
| | Sorbitol | 2.0 | | | | | | | |
| | Stearic acid | 0.5 | | | | | | | |
| 5 | Zn ethylacetoacetate | 0.8 | 0 | 1.5–2.4 | 194–214 | 9.0 | 2.0 | 6.5 | |
| | Epoxidized soybean oil | 5.0 | | | | | | | |
| | Acryloid K120N | 5.0 | | | | | | | |
| | Ca stearate | 0.4 | | | | | | | |
| | Sorbitol | 2.0 | | | | | | | |
| | Stearic acid | 0.5 | | | | | | | |
| 6 | Epoxidized soybean oil | 5.0 | 0 | 1.5–2.3 | 194–210 | 11.0 | 7.0 | 15 | >15 |
| | Acryloid K120N | 5.0 | | | | | | | |
| | Ca stearate | 0.4 | | | | | | | |
| | Sorbitol | 2.0 | | | | | | | |
| | Stearic acid | 0.5 | | | | | | | |

The above examples clearly illustrate that our presently claimed zinc ethylacetoacetate chelate may be readily prepared using the method disclosed herein and that the present chelate possesses utility as a PVC additive.

As used herein the term "lower alkanol" means an alkanol having about 1–3 carbon atoms per molecule.

We claim:

1. A method for preparing zinc ethyl acetoacetate chelate which comprises reacting zinc methoxide with ethyl acetoacetate in the presence of a lower alkanol, and recovering the zinc ethyl acetoacetate chelate formed thereby.

2. The method of claim 1 conducted at a temperature of from about 0 to about 100° C.

References Cited

UNITED STATES PATENTS

| | | |
|---|---|---|
| 2,845,465 | 7/1958 | Cull et al. |
| 2,924,614 | 2/1960 | Reuter. |
| 2,933,475 | 4/1960 | Hoover et al. |
| 2,948,747 | 8/1960 | Karbum et al. |
| 3,157,682 | 11/1964 | Ramsden. |
| 3,347,790 | 10/1967 | Meinhardt ____ 260—429.9 XR |

FOREIGN PATENTS 907,558  10/1962  Great Britain.

TOBIAS E. LEVOW, *Primary Examiner.*

H. M. S. SNEED, *Assistant Examiner.*